United States Patent [19]
Brunsman et al.

[11] Patent Number: 5,370,516
[45] Date of Patent: Dec. 6, 1994

[54] APPARATUS FOR MANUFACTURING SEATING COMPONENTS

[75] Inventors: Paul M. Brunsman, Armada; Eric Klebba, Pontiac; Lawrence J. Riley, Warren; Michael N. Walkowski, Ray, all of Mich.

[73] Assignee: Hoover Universal, Inc., Plymouth, Mich.

[21] Appl. No.: 113,199

[22] Filed: Aug. 30, 1993

[51] Int. Cl.⁵ .................................. B29C 65/00
[52] U.S. Cl. ...................... 425/62; 264/267; 425/112; 425/183; 425/298; 425/453; 425/454; 425/817 R; 425/DIG. 201
[58] Field of Search .............. 264/163, 267; 425/4 R, 425/62, 112, 183, 253, 298, 452, 453, 454, 817 R, DIG. 201

[56] References Cited

U.S. PATENT DOCUMENTS

| | | | |
|---|---|---|---|
| 3,677,670 | 7/1972 | Mori et al. | 425/62 |
| 3,882,792 | 5/1975 | McIntier | 425/453 |
| 3,907,482 | 9/1975 | Shiota et al. | 425/453 |
| 4,083,671 | 4/1978 | Niederst et al. | 425/4 R |
| 4,508,499 | 4/1985 | Spengler | 425/112 |
| 4,519,766 | 5/1985 | Spengler | 425/453 |
| 4,618,321 | 10/1986 | Claisen | 425/62 |
| 4,691,906 | 9/1987 | Zastrow | 425/183 |
| 4,737,091 | 4/1988 | Fiorentini | 425/4 R |
| 4,740,260 | 4/1988 | Selbert et al. | |
| 4,755,117 | 7/1988 | Onnenberg et al. | 425/112 |
| 4,755,120 | 7/1988 | Onnenberg et al. | 425/4 R |
| 4,860,415 | 8/1989 | Witzke | |

FOREIGN PATENT DOCUMENTS

| | | | |
|---|---|---|---|
| 56-80434 | 7/1981 | Japan | 425/183 |

*Primary Examiner*—Charles S. Bushey
*Attorney, Agent, or Firm*—Harness, Dickey & Pierce

[57] ABSTRACT

A machine for the production of seating components having a plurality of movable press centers which are moved about by a track to a plurality of workstations where different manufacturing operations are performed. The track is equipped with transfer capability to selectively bypass one or more of the workstations to enable different components to be made simultaneously using different methods. The track can further move a press center off line for repair without interrupting the operation of the machine.

14 Claims, 3 Drawing Sheets

APPARATUS FOR MANUFACTURING SEATING COMPONENTS

BACKGROUND AND SUMMARY OF THE INVENTION

The present invention relates to an apparatus for manufacturing seating components and in particular to an apparatus with improved productivity by allowing certain time consuming operations to be performed "off-line" and/or to provide multiple stations for simultaneously performing time consuming operations.

Assignee of the present invention has developed and patented two methods for manufacturing seat components such as a seat cushion or a seat back. These methods are described in U.S. Pat. Nos. 4,740,260 and 4,860,415. These patents are hereby incorporated by reference. U.S. Pat. No. 4,740,260 describes a process in which a seat component is manufactured by first shaping a cover member between the fixed and movable dies of a press. After the cover member has been shaped, a preshaped foam pad is adhesively bonded to the inner surface of the cover member. U.S. Pat. No. 4,860,415, describes a process in which, after the cover member is shaped, a foam pad is molded in place directly on the shaped cover member through a pour-in-place process.

Heretofore, seating components have been manufactured using one of the two above methods in which the seat components are manufactured on a carousel style machine. After all of the operations have been performed at each workstation of the machine, the machine advances each workpiece to the next workstation. The productivity of such a machine is limited by the operation that takes the longest time to complete. A further disadvantage of a carousel machine is that when a break down occurs at one workstation, the entire machine has to be stopped until the repair is completed. Another disadvantage is that all workpieces must travel to each workstation even if a process is being used which does not require a stop at each workstation.

It is an object of the present invention to provide a machine for manufacturing seating components which overcomes the above disadvantages.

The machine of the present invention includes a plurality of movable press centers each containing the tooling necessary to manufacture a seating component. A track is provided for guiding movement of the press centers along a predetermined path. The path moves the press centers passed a plurality of workstations at which different operations are performed in the manufacturing of the seating components.

To provide flexibility to the machine and to overcome the above disadvantages, the track is capable of selectively bypassing one or more of the workstations. This enables the machine to have multiple workstations for performing a particularly long operation and/or enables the machine to be configured so that different seating components are manufactured simultaneously using different methods. The press centers will only stop at the necessary workstations for a given method. In addition, the track enables the press centers to be moved off-line for repair without interfering with the operation of the remaining press centers and the production of seating components.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
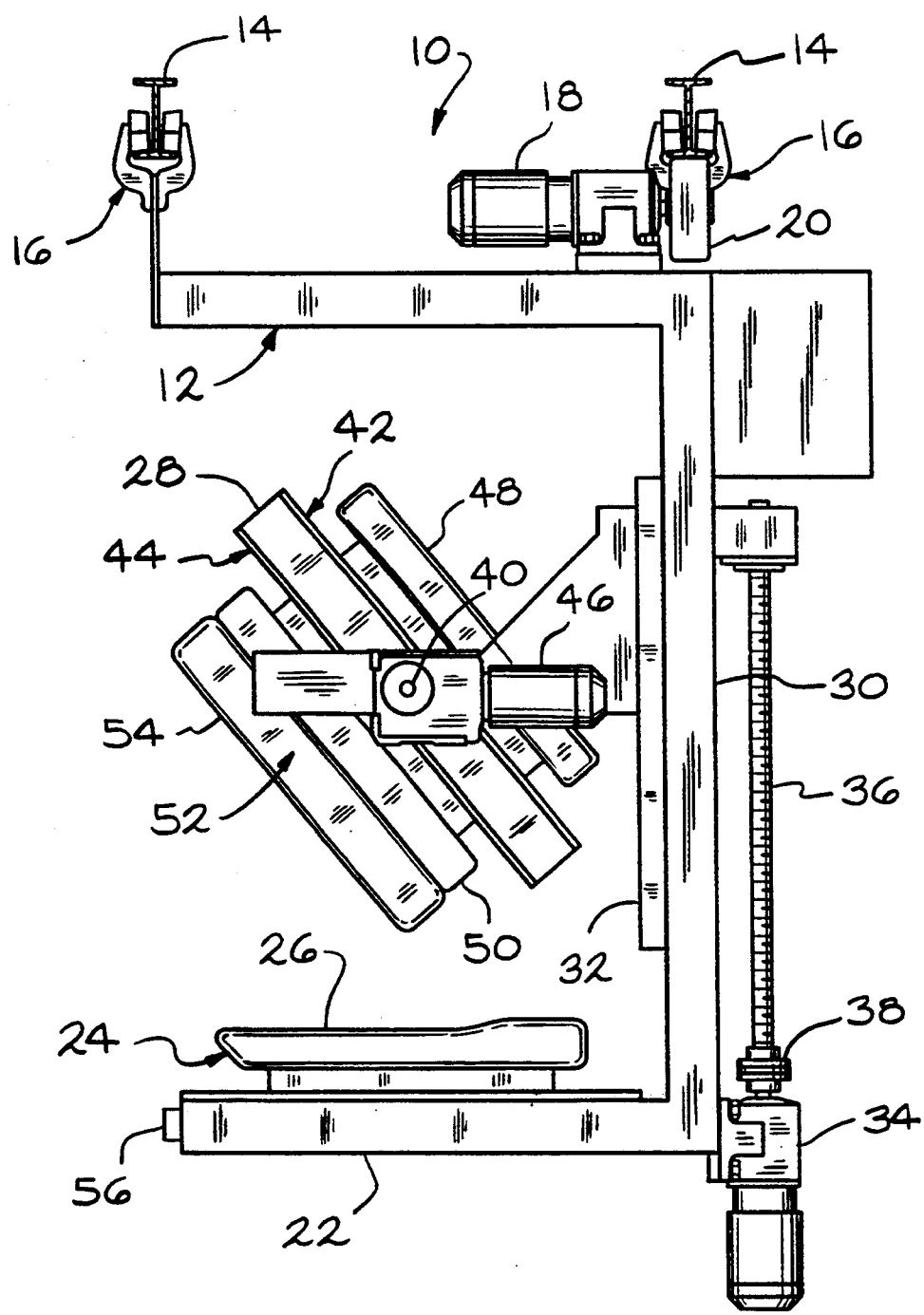
FIG. 1 is a side elevational view of one of the movable press centers of the machine of the present invention.

With reference to FIG. 1, a movable press center for the machine of the present invention is shown and designated generally at 10. The press center 10 includes a frame 12 which is suspended from a pair of I-beams 14 by wheel assemblies 16. The I-beams 14 form a track for moving the press center 10. A motor 18 is coupled to a drive wheel 20 which engages the lower surface of one of the I-beams 14 to move the press center along the path of the I-beams.

The lower portion 22 of the frame supports a trim tool 24 having a top surface 26 contoured or shaped complementary to the desired shape for an exposed surface of a seat component such as a seat cushion or seat back. The lower portion 22 of frame 12 serves as a fixed press platen while the trim tool 24 functions as a press die.

A movable press platen 28 is carried on the vertical portion 30 of the frame 12 and is guided for vertical movement by a guide 32. A drive motor 34 coupled to a drive screw 36 through coupling 38 is operable to raise and lower the movable platen 28. The movable platen 28 is further rotatable about the axis of horizontal shaft 40 so that one of two sides 42 or 44 of the platen 28 can face the stationary trim tool 24. A third drive motor 46 is operable to rotate the platen 28.

The side 42 of the movable platen 28 carries a press die or a form tool 48. The face of form tool 48 is shaped complementary to the face 26 of the trim tool 24. At one workstation as described below, after a seat cover member has been placed on the trim tool 24, the form tool 48 is pressed thereon to shape the cover member to the shape of the trim tool.

After the cover member has been so shaped, a foam pad is then applied to the cover member either by adhesively bonding a preshaped pad thereon or by molding a foam pad directly onto the cover member. The side 44 of the press platen as shown in FIG. 1 carries a mounting fixture 50, which, through vacuum or the like, releasably mounts a preshaped foam pad 52. After the surface 54 of the pad 52 has been coated with an adhesive, the foam pad is lowered onto the cover member on the trim tool and held in place as the adhesive cures.

Figure 3:
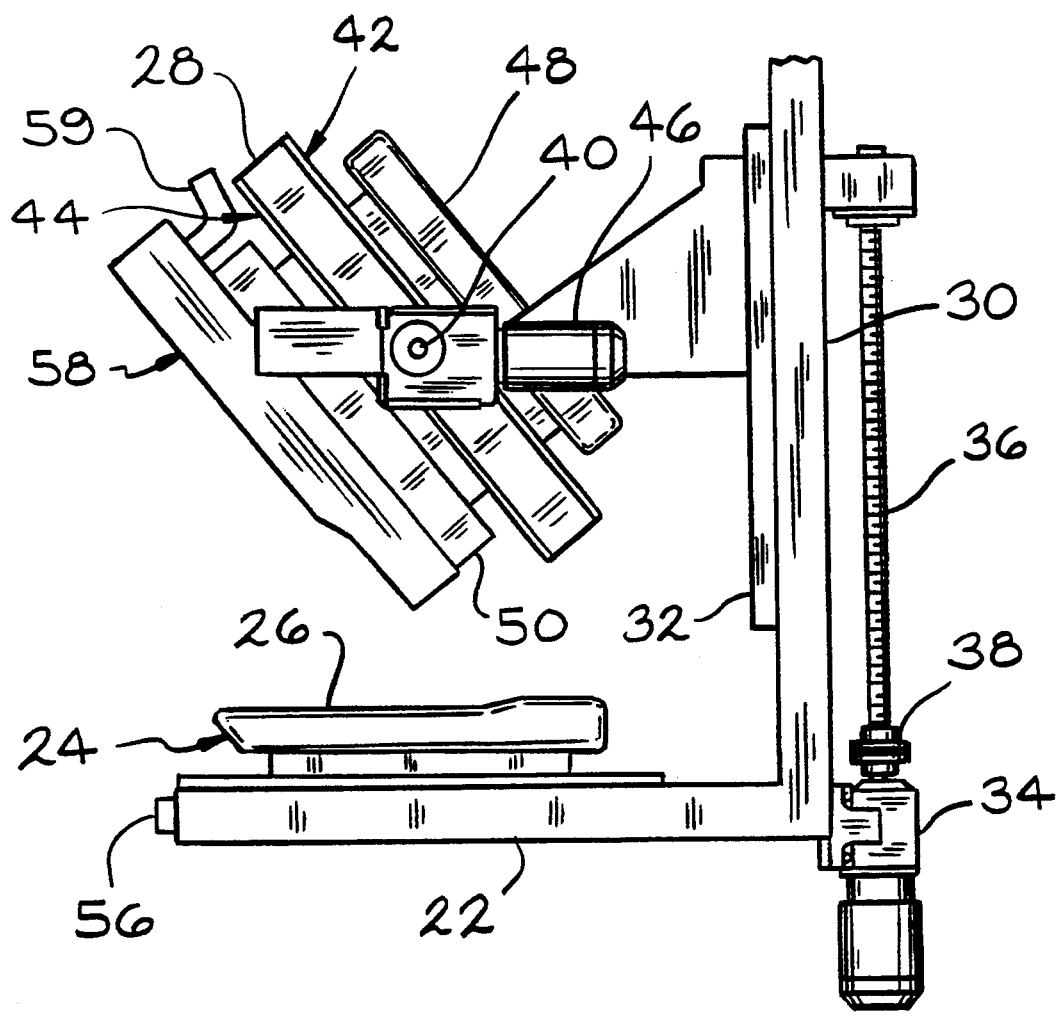
FIG. 3 is an alternative embodiment of the press center shown in FIG. 1 carrying a pour-in-place foam mold.

The mounting fixture 50, rather than mounting a preshaped foam pad, could mount a pour-in-place foam mold 58 with a foam inlet 59 for use in molding a foam pad directly on the shaped cover member as shown in FIG. 3. Such a method would be performed by lowering the mold onto the cover member in such a manner that the cover member forms a portion of the mold cavity surface. A liquid foaming agent is poured into the mold cavity and allowed to cure. Such a process is more fully described in the above referenced U.S. Pat. No. 4,860,415.

Multiple press centers 10 are used in the machine of the present invention and can be configured either for applying a preformed foam pad or for use in molding the foam pad directly on the cover member with a pour-in-place method. Both operations can performed by the machine at the same time. The various press centers are coded with a programmable encoder 56 to direct the press centers 10 to various workstations and to bypass various other workstations, depending upon the method to be used and the seat component being manufactured.

Figure 2:
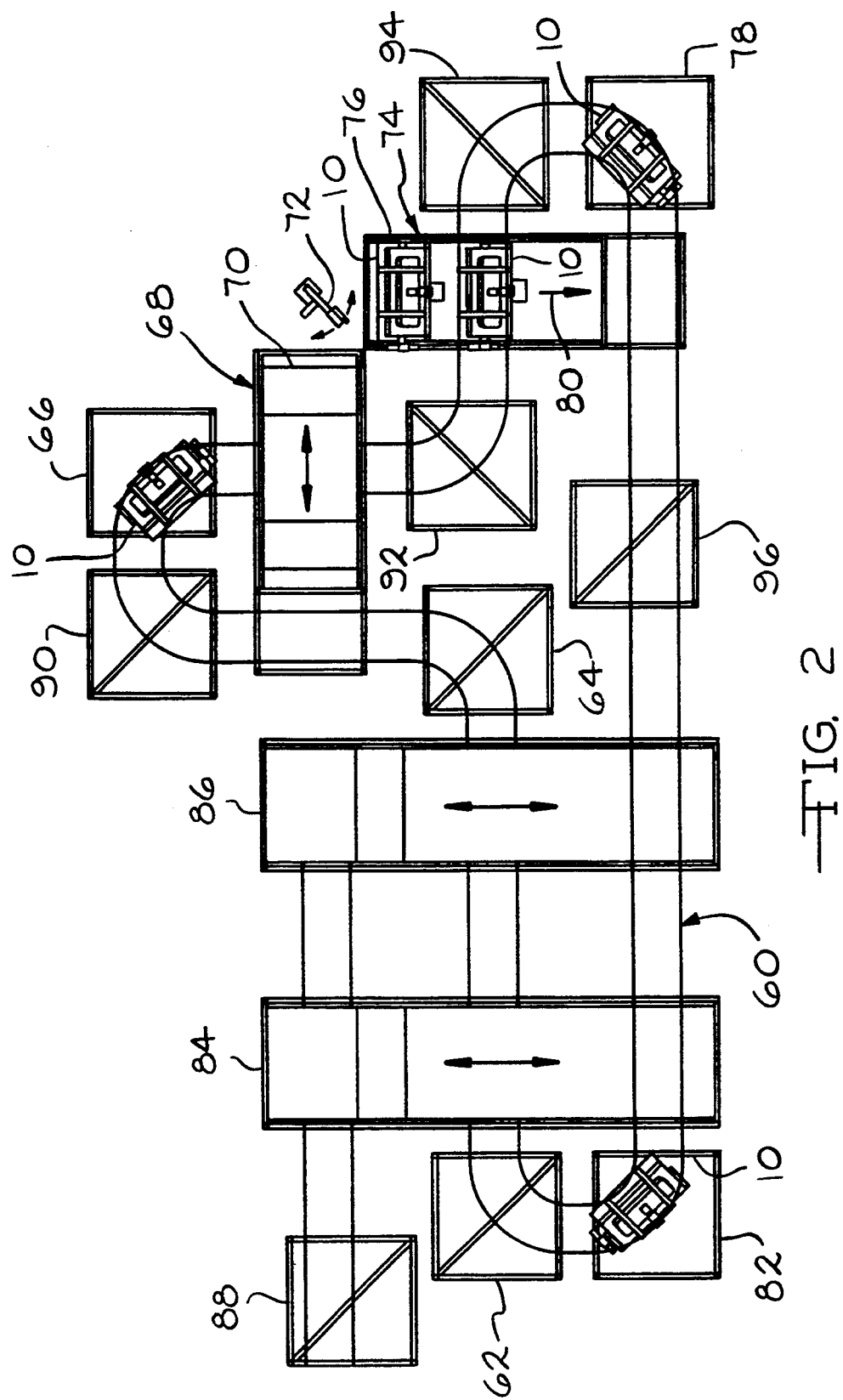
FIG. 2 is an example layout of the path for moving the press centers passed a plurality of different workstations for performing different manufacturing operations.

A plan view of the machine of the present invention for manufacturing seat components is shown in FIG. 2. The configuration shown in FIG. 2 is intended only as an example and is not to limit the overall scope of the invention. The I-beams 14 form a generally endless track 60 on which a plurality of the press centers 10 are moved. Only a portion of the press centers are shown. The track 60 moves the press centers 10 to a plurality of workstations described below at which various operations are performed in the manufacture of a seat component.

The first workstation, station 62 is a loading station at which point a cover member is positioned upon the trim tool of the press center. From workstation 62 the press center is moved to workstation 64 where the form tool is lowered onto the trim tool to shape the cover member. From workstation 64 the press center is moved to a second loading workstation 66 where a preshaped foam pad is loaded onto the mounting structure 50. After the foam pad has been mounted, the press center is moved to the transfer station 68 where the press center is moved off-line to a workstation 70. There an adhesive is sprayed on the foam pad by the spray gun 72. Alternatively, the press center can be moved from the workstation 66 to a second transfer station 74 and to off-line workstation 76, a second workstation where adhesive is applied by the spray gun 72.

After adhesive is applied, the foam pad is lowered onto the cover member and bonded thereto by operation of the press center drive motor 34. From either workstation 70 or 76 the press centers are transferred by the transfer station 74 to bypass the workstation 78 as shown by the arrow 80. From there the press centers are moved to the final workstation 82 where the completed seat component is unloaded.

In an alternative process, the press centers can use the transfer station 74 to bypass workstation 76 and move into the workstation 78. Station 78 is a pour in place foam workstation where a press center equipped with a foaming mold is supplied with a liquid foaming agent to form the foam pad. In such a process, both the foam pad loading workstation 66 and the two glue applying workstations are bypassed.

Additional workstations 90, 92, 94 and 96 are shown which can be used for additional operations not discussed above, providing flexibility to the machine. For example, both workstations 94 and 78 can be pour-in-place foaming workstations. A press center is moved into each workstation at one time whereby two foam pads are molded simultaneously. While two press are having foam pads molded thereon, the remaining press centers of the machine can be moved through two workstations.

Two other transfer stations 84 and 86 are shown which enable press centers to be moved on and off-line and to a repair station 88 where a press center can be repaired or otherwise worked on. Transfer stations 84 and 86 can also be used to temporarily move a press center off-line for the purposes of delay, etc., if necessary.

Other alternative operating methods can be used with the machine. For example, both the cover member and the preshaped foam pad can be loaded at the first workstation 62. Workstations 66 end 78 can be used for pour-in-place foaming of the foam pads used by a portion of the press centers. The other press centers which use the preshaped foam pads can be routed by the transfer stations 68 and 74 to the two adhesive spray workstations 70 and 76.

It can be seen that the machine of the present invention provides a great deal of flexibility to the production of seating components. In addition, those operations which require considerable time to complete can be performed off-line in multiple workstations, enabling a high production capacity to be maintained. Furthermore, when one press center needs repair, it can be moved off-line where it will not interfere with the operation of the machine.

It is to be understood that the invention is not limited to the exact construction illustrated and described above, but that various changes and modifications may be made without departing from the spirit and scope of the invention as defined in the following claims.

We claim:

1. Apparatus for manufacturing seating components having a foam pad with at least one shaped surface and a cover member shaped to correspond to said at least one shaped surface, said apparatus comprising:

a plurality of movable press centers having tooling thereon necessary for the manufacture of said seating components and including drive means for moving said press centers, said press centers including a stationary press platen carrying a trim tool for shaping said cover member, a movable press platen having two sides with different tools on each side for performing different manufacturing operations, means for rotating said movable press platen so one side or the other of said movable press platen faces said stationary press platen, and press means for moving said movable press platen toward said stationary press platen to move one of said tools to said trim tool for performing said manufacturing operations; and track means for guiding movement of said movable press centers along an endless path past a plurality of workstations at which different operations are performed in the manufacture of said seating components;

said track means including transfer means for selectively bypassing one or more of said plurality of workstations along said path whereby the workstations at which a given movable press center stops are selectively variable.

2. The apparatus for manufacturing seating components of claim 1 wherein said transfer means is operable to move said press centers off of said endless path to off-line workstations.

3. The apparatus for manufacturing seating components of claim 2 wherein one of said off-line workstations is a repair station to which said movable press centers are movable without interrupting the operation of the remaining press centers.

4. The apparatus for manufacturing seating components of claim 1 wherein one of the tools on said movable press platen is a form tool shaped complementary to said trim tool for shaping said cover member therebetween.

5. The apparatus for manufacturing seating components of claim 1 wherein one of the tools on said movable press platen is a mounting fixture for releasably mounting a preshaped foam pad.

6. The apparatus for manufacturing seating components of claim 1 wherein one of the tools on said movable press platen is a pour-in-place foaming mold for molding a foam pad directly onto a cover member.

7. A movable press center for use in manufacturing seating components having a foam pad with at least one shaped surface and a cover member shaped to correspond to said at least one shaped surface, said press centers including:
- a stationary press platen carrying a trim tool for shaping said cover member;
- a movable press platen having two sides with different tools on each side for performing different manufacturing operations;
- means for rotating said movable press platen so one side or the other of said movable press platen faces said stationary press platen; and
- press means for moving said movable press platen toward said stationary press platen to move one of said tools to said trim tool for performing one of said manufacturing operations.

8. The movable press center for use in manufacturing seating components of claim 7 wherein one of the tools on said movable press platen is a form tool shaped complementary to said trim tool for shaping said cover member therebetween.

9. The movable press center for use in manufacturing seating components of claim 7 wherein one of the tools on said movable press platen is a mounting fixture for releasably mounting a preshaped foam pad.

10. The movable press center for use in manufacturing seating components of claim 7 wherein one of the tools on said movable press platen is a pour-in-place foaming mold for molding a foam pad directly onto said cover member.

11. The movable press center for use in manufacturing seating components of claim 7 further comprising drive means for moving said press center along a predetermined path.

12. Apparatus for manufacturing seating components having a foam pad with at least one shaped surface and a cover member shaped to correspond to said at least one shaped surface, said apparatus comprising:
- a plurality of movable press centers having tooling thereon necessary for the manufacture of said seating components and including drive means for moving said press centers, said tooling including a stationary press platen carrying a trim tool for shaping said cover member, a movable press platen having two sides, a form tool on one side of said movable press platen shaped complementary to said trim tool for shaping said cover member therebetween, a mounting fixture for releasably mounting a preshaped foam pad on the other side of said movable press platen and means for rotating said movable press platen so one side or the other of said movable press platen faces said stationary press platen, and press means for lowering said movable press platen toward said stationary press platen;
- track means for guiding movement of said movable press centers along an endless path past a plurality of workstations at which different operations are preformed with said press centers in the manufacture of said seating components;
- a first workstation where a cover member is installed on said trim tool and a foam pad is mounted on said mounting fixture;
- a second workstation where said form tool is moved against said cover member on said trim tool to shape said cover member;
- a third workstation where adhesive is applied to said shaped surface of said foam pad;
- a fourth workstation where said foam pad is pressed onto said cover member whereby said adhesive bonds said foam pad to said cover member; and
- a fifth workstation where said cover member with the foam pad bonded thereto is removed from said trim tool;
- said track means including transfer means for selectively bypassing one or more of said plurality of workstations along said path whereby the workstations at which a given movable press center stops are selectively variable.

13. The apparatus for manufacturing seating components of claim 12 wherein said transfer means is operable to move said press centers off of said endless path to off-line workstations.

14. The apparatus for manufacturing seating components of claim 13 wherein one of said off-line workstations is a repair station to which said movable press centers are movable without interrupting the operation of the remaining press centers.

* * * * *